(12) United States Patent
Chiou et al.

(10) Patent No.: US 10,117,447 B1
(45) Date of Patent: Nov. 6, 2018

(54) EXTRUSION OF HIGH DENSITY HYDROXYPROPYLMETHYLCELLULOSE EDIBLE FLEXIBLE GELS

(71) Applicants: The United States of America, as represented by the Secretary of Agriculture, Washington, DC (US); DOW Global Technologies LLC, Midland, MI (US)

(72) Inventors: Bor-Sen Chiou, Albany, CA (US); Syed H Imam, Walnut Creek, CA (US); Wallace H Yokoyama, Davis, CA (US); Stephanie K Lynch, Springfield, MO (US)

(73) Assignees: The United States of America, as represented by The Secretary of Agriculture, Washington, DC (US); Dow Global Technologies LLC, Albany, CA (US)

( * ) Notice: Subject to any disclaimer, the term of this patent is extended or adjusted under 35 U.S.C. 154(b) by 926 days.

(21) Appl. No.: 14/216,551

(22) Filed: Mar. 17, 2014

Related U.S. Application Data

(60) Provisional application No. 61/792,138, filed on Mar. 15, 2013.

(51) Int. Cl.
  *C08B 15/00* (2006.01)
  *C08B 31/00* (2006.01)
  *A23L 1/0534* (2006.01)
  *A23P 1/12* (2006.01)
  *C08B 11/00* (2006.01)

(52) U.S. Cl.
  CPC ............... *A23L 1/0534* (2013.01); *A23P 1/12* (2013.01); *C08B 11/00* (2013.01); *C08B 31/00* (2013.01); *C08B 15/00* (2013.01)

(58) Field of Classification Search
  CPC .......... C08B 11/00; C08B 15/00; C08B 31/00
  USPC ................................... 426/567, 573; 536/56
  See application file for complete search history.

(56) References Cited

U.S. PATENT DOCUMENTS 3,582,357 A * 6/1971 Katz ..................... A23G 3/52
                                                        426/34

FOREIGN PATENT DOCUMENTS

WO    WO 9961002 A1 * 12/1999 ........... A61K 9/1652

OTHER PUBLICATIONS

Methocel™/Starch 1500® reprinted in 2010, hereinafter Missaghi, 2010, pp. 5.*

* cited by examiner

*Primary Examiner* — Jyoti Chawla
(74) *Attorney, Agent, or Firm* — John D. Fado; Ariel L. Atkinson

(57) ABSTRACT

A method for and product of the low temperature extrusion of food grade HPMC by sequential addition of powdered HPMC with or without starch is disclosed herein.

7 Claims, 1 Drawing Sheet

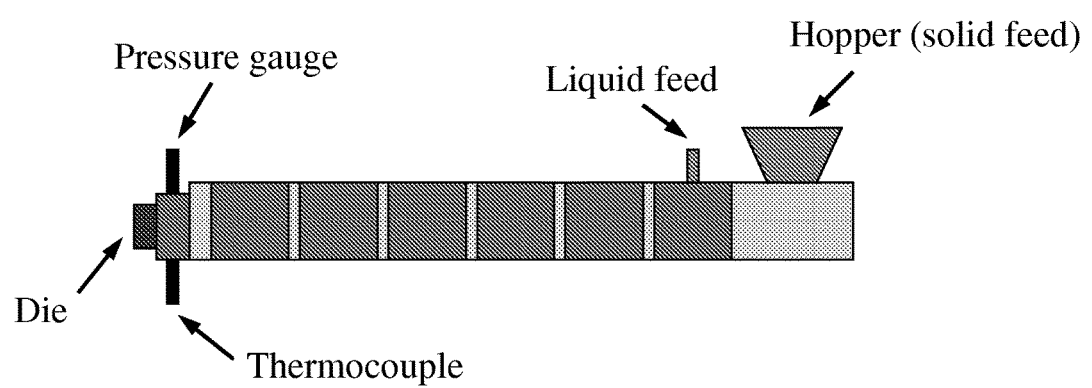

EXTRUSION OF HIGH DENSITY HYDROXYPROPYLMETHYLCELLULOSE EDIBLE FLEXIBLE GELS

FIELD OF THE INVENTION

This invention describes the extrusion of food grade HPMC into an edible shelf-stable, high density, healthful flexible gel high in soluble dietary fiber.

BACKGROUND OF THE INVENTION

Hydroxypropylmethylcellulose (HPMC) is a modified, water-soluble cellulosic fiber that has shown considerable health benefits, such as lowering of blood cholesterol and blood glucose, and prevention of insulin resistance. Because HPMC is indigestible and readily soluble in water, it is extensively used by the pharmaceutical industry for drug delivery. The material is very sensitive to moisture and heat. Upon moisture absorption, HPMC turns into a viscous and cohesive gel, and at temperatures at or above 60° C., fibers coagulate in solution disallowing their dispersion. Herein is described a compounding extrusion of HPMC through two temperature zones, with water added in the second temperature zone, producing a moist flexible dispersed fiber of consistent texture exhibiting densities higher than previously reported (U.S. Pat. No. 5,488,144) wherein the cooling generally required for extrusion of HPMC is not required.

SUMMARY OF THE INVENTION

A method for the low temperature extrusion of food grade HPMC by sequential addition of powdered HPMC with or without starch to an extruder with subsequent addition of water under sufficient time and pressure.

An embodiment of the invention is the high density HPMC formed from the sequential addition of HMPC to an extruder with subsequent addition of water under sufficient time and pressure.

BRIEF DESCRIPTION OF THE DRAWINGS

FIG. 1 is a diagram of the process as used with a Leistritz Micro 18 co-rotating twin-screw extruder, screw diameter of 18 mm, barrel length to diameter of 30:1 and 6 heating zones.

DETAILED DESCRIPTION OF THE INVENTION

The present invention will now be described by reference to more detailed embodiments, with occasional reference to the accompanying tables. This invention may, however, be embodied in different forms and should not be construed as limited to the embodiments set forth herein Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement.

Herein is described a compounding extrusion of hydroxypropylmethylcellulose (HPMC) with water into a moist flexible gel (of dispersed fiber) of consistent texture. The extruded HPMC gel exhibits the physical characteristic of high density, specifically densities ranging from 0.8 to 0.9 g/ml. The HPMC powder is first introduced into the twin-screw extruder in a low temperature zone (30° C.) and the water is introduced into the barrel at a later stage at a temperature range of 40° C.-60° C. The extrusion can be done with any device that applies sufficient pressure to push the cellulose ether through the extrusion. Pump-type extruders may be used if adapted for addition of the components separately; however, a preferred embodiment is a screw-type extruder which advances the hydrated cellulose ether by means of a screw rotating inside a cylinder. Screw-type extruders are generally not regarded in the art as energy efficient as pump-type extruders and convert much of the energy to heat which causes the temperature of the cellulose ether to increase and with resulting dehydration without an additional cooling device. The addition of water to the extruder in the latter stage of powdered HPMC delivery into the extruder eliminates this need for a cooling device.

HPMC powder weight of 25% to 50% is fed with into the extruder with water added subsequently (through first barrel if screw extruder is used) at a respective weight of 75% to 50%. A preferred embodiment utilizes a HPMC feed rate was at 5 g/min, water feed rate was at 10 g/min, and screw speed maintained at 60 rpm.

An embodiment of the invention is the addition of 5-30% starch of any botanical origin to the HPMC powder. A preferred embodiment is the use of pre-gelatinized starch. The addition of starch protected fibers from coagulating and yielded gels that were more stable and flexible while allowing the temperature in the mixing zone of extrusion to be raised to 60° C. without impacting HPMC dispersion in the gel.

A Leistritz Micro 18 co-rotating twin-screw extruder was used to prepare the HPMC samples. The extruder has six heating zones with the first five cooled by water. The screws have a diameter of 18 mm and the barrel has a length to diameter ratio of 30:1. The configuration and type of screw elements used in the experiments are shown in Table I. A K-Tron Soder T-20 loss-in-weight feeder was used to control the solids (HPMC) feed rate. A Bran + Luebbe N-P31 metering pump was used to control the deionized water feed rate.

TABLE I

Screw Configuration

| Type of Element[a] | Pitch (cm) | Overall Length (cm) | Number of Kneading Blocks | Angle (°) |
|---|---|---|---|---|
| Conveying[b] | 3 | 9 | — | — |
| Conveying | 2 | 9 | — | — |
| Kneading Block | — | 2 | 4 | 30 |
| Kneading Block | — | 2 | 4 | 60 |
| Conveying | 1 | 9 | — | — |
| Kneading Block | — | 2 | 4 | 90 |
| Kneading Block | — | 2 | 4 | 90 |
| Conveying | 2 | 12 | — | — |
| Conveying | 1 | 6 | — | — |

[a]All elements are double flighted
[b]Screw element descriptions proceed from feed end to die end Extruded samples tested on the texture analyzer indicated that upon refrigeration, the material retained most of their physical properties (softness, moisture and flexibility) for a long period of time and a cycle of freezing and thawing had little impact on gel property. However, when left at room temperature (23° C.) and 50% relative humidity for a few days, the gel hardened somewhat. Addition of a minute amount of food grade calcium source prevented any visible growth of fungus or bacteria and did not impact the quality of the gels.

The shapes that can be obtained are consistent with those desired by one of skill in the art such as sheets, rods, balls, and other shapes of varying sizes. A preferred embodiment is a sheet with an associated density of 0.8 to 0.9 mg/l.

The extruded hydroxypropylmethylcellulose products of this invention can be used in a wide variety of applications. They are used as thickeners in adhesives, paints, shampoos, and foods. The extruded cellulose products can also be used as dispersing agents in pesticides and fertilizers. Another use for the products is in pharmaceuticals as tablet coatings, such as U.S. Pat. No. 4,001,211, and controlled release formulations. A preferred embodiment is a high fiber food substitute for cheese.

What is claimed is:

1. A method for the extrusion of hydroxypropylmethylcellulose by sequential addition of a mixture of hydroxypropylmethylcellulose and starch to an extruder with subsequent addition of 50-75% (w/w) of water to the extruder under sufficient time and pressure to produce an extruded hydroxypropylmethylcellulose product.

2. The method of claim 1, wherein the addition of hydroxypropylmethylcellulose and starch to the extruder occurs under a temperature of about 30° C. and the addition of water to the extruder occurs under a temperature of about 40° C.-60° C.

3. The method of claim 2, wherein the starch is mixed with hydroxypropylmethylcellulose at a concentration of 5-30%.

4. The method of claim 3, wherein the addition of water to the extruder occurs under a temperature of about 60° C.

5. The extruded hydroxypropylmethylcellulose product of claim 2,
    wherein the product is a gel with a density of 0.8 to 0.9 g/ml.

6. The extruded hydroxypropylmethylcellulose product of claim 5,
    wherein the extruded hydroxypropylmethylcellulose product comprises 25% to 50% hydroxypropylmethylcellulose by weight.

7. The extruded hydroxypropylmethylcellulose product of claim 5, wherein the extruded hydroxypropylmethylcellulose product comprises 5-30% starch relative to the amount of hydroxypropylmethylcellulose.

* * * * *